June 16, 1936.  R. E. ROBB  2,044,017
APPARATUS FOR PROPORTIONING AND WEIGHING BATCH WEIGHTS
Filed June 28, 1929   7 Sheets-Sheet 1
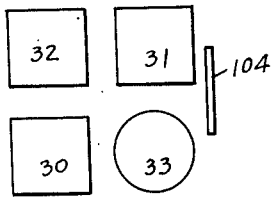
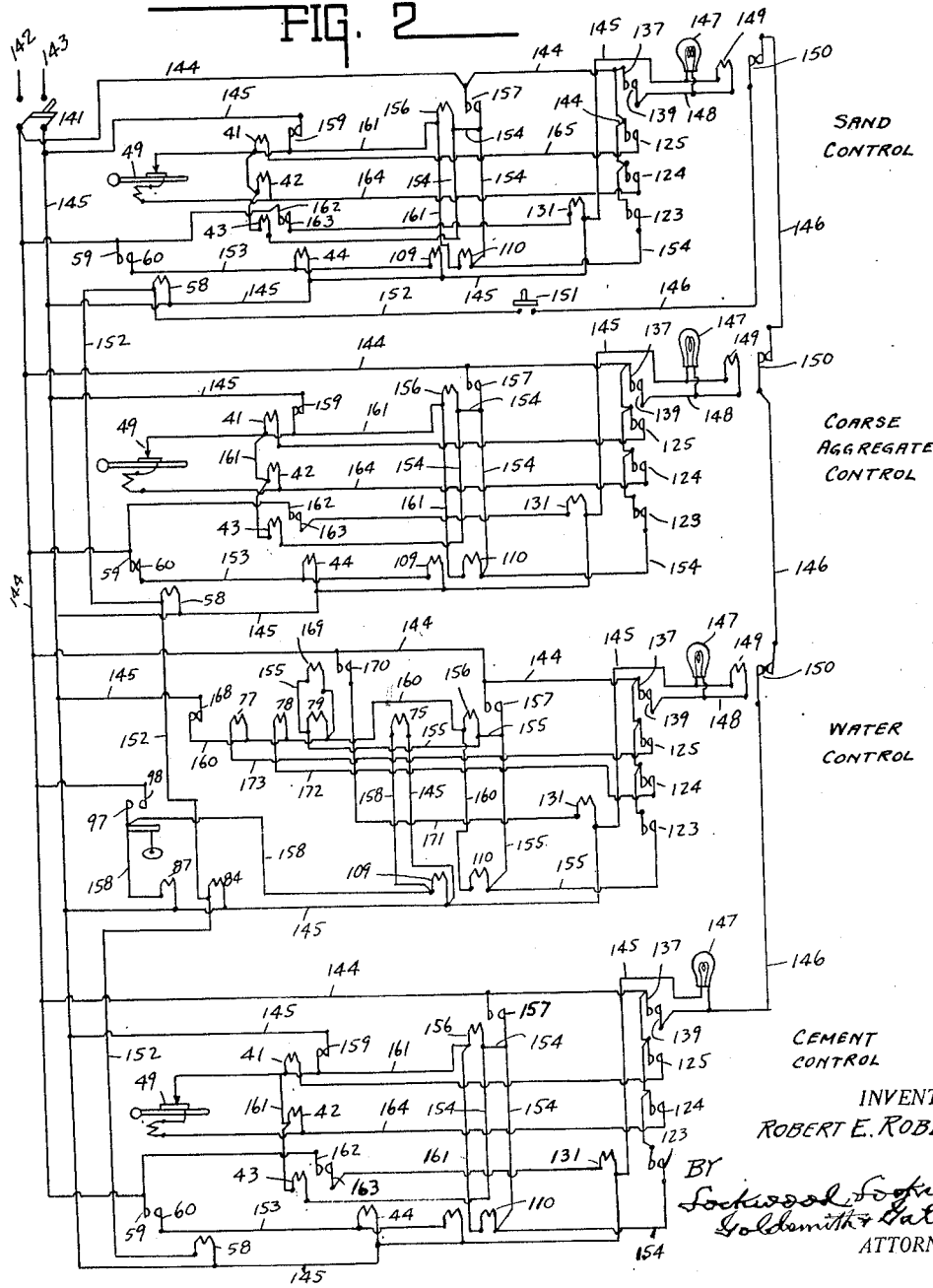
INVENTOR.
ROBERT E. ROBB.
BY
Lockwood Lockwood,
Goldsmith & Latt
ATTORNEYS.

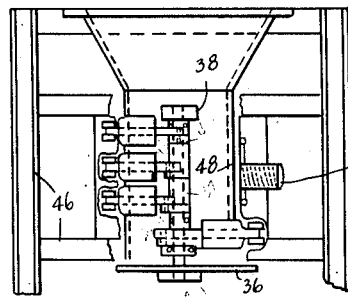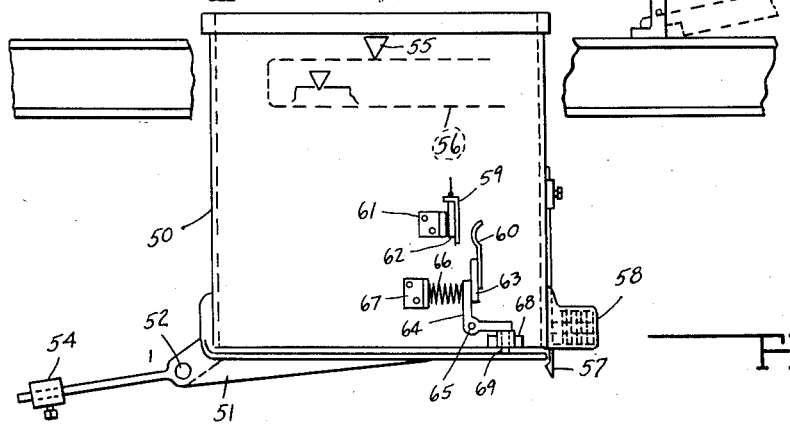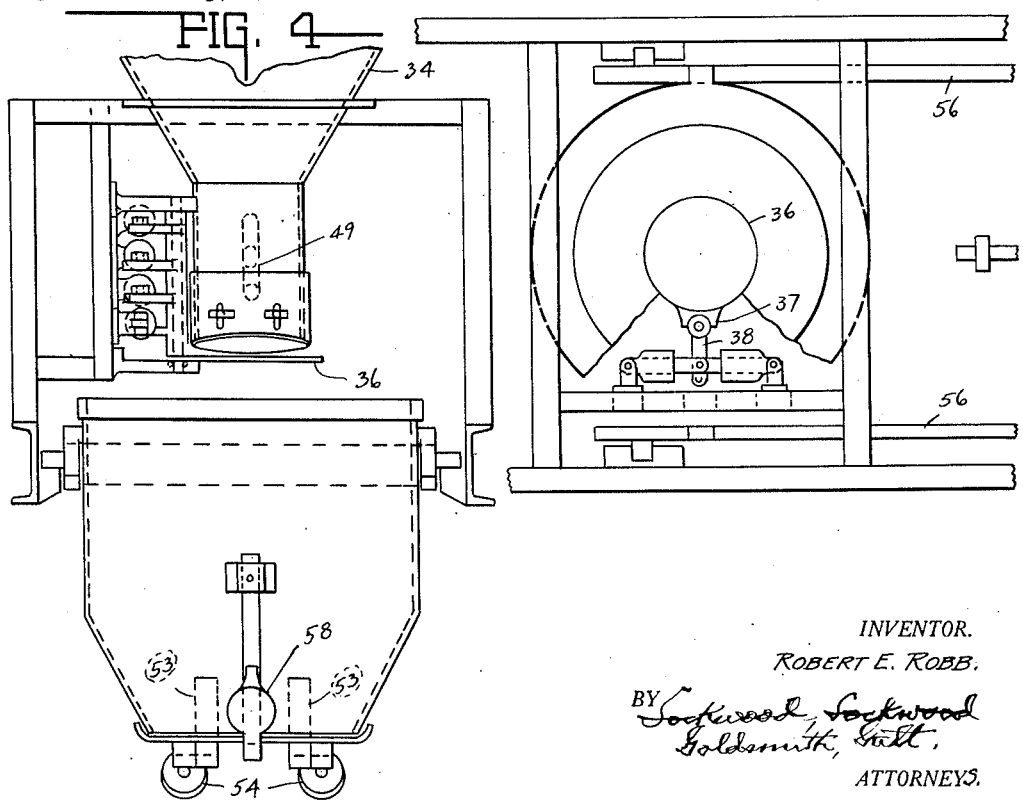

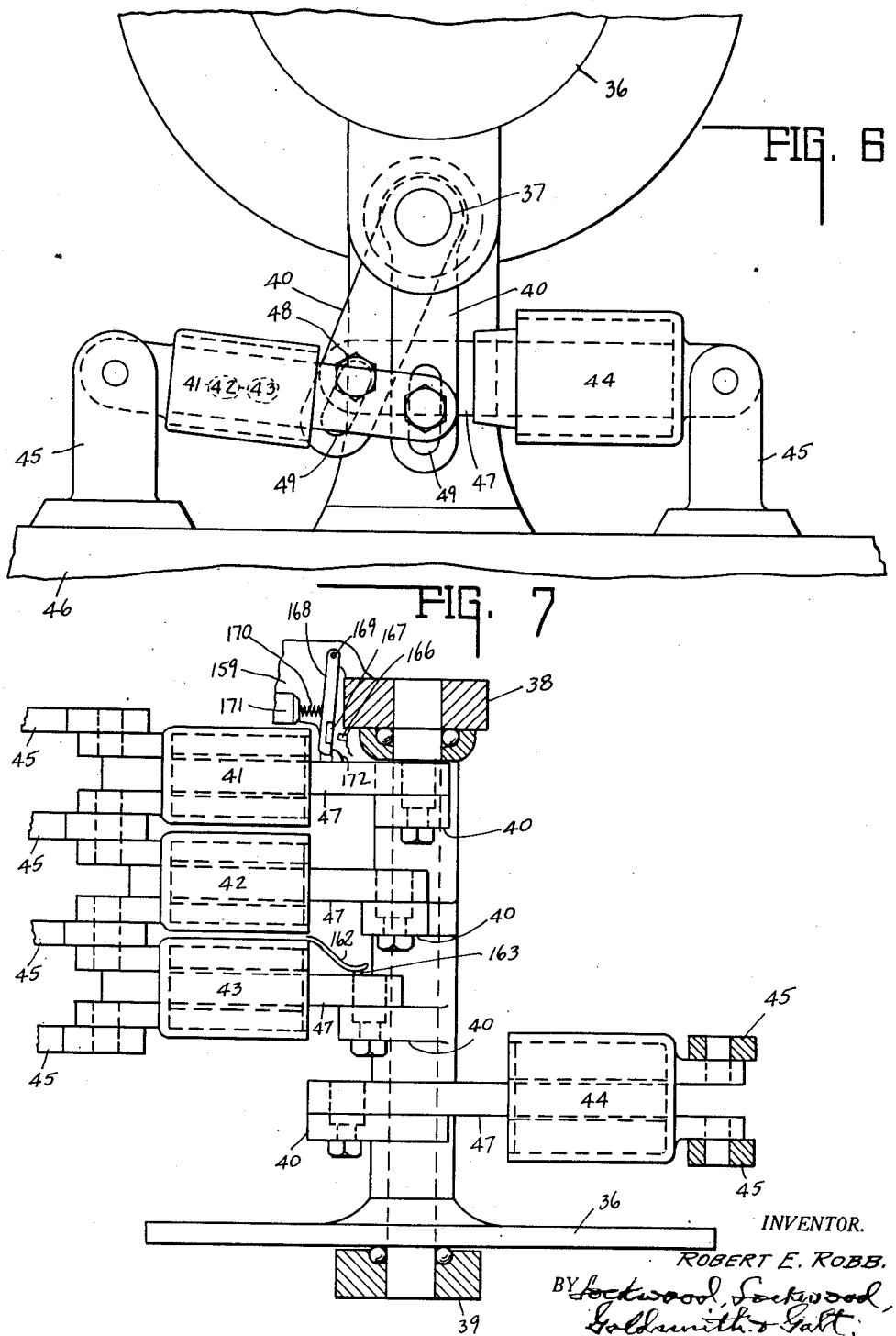

June 16, 1936.   R. E. ROBB   2,044,017
APPARATUS FOR PROPORTIONING AND WEIGHING BATCH WEIGHTS
Filed June 28, 1929   7 Sheets-Sheet 4
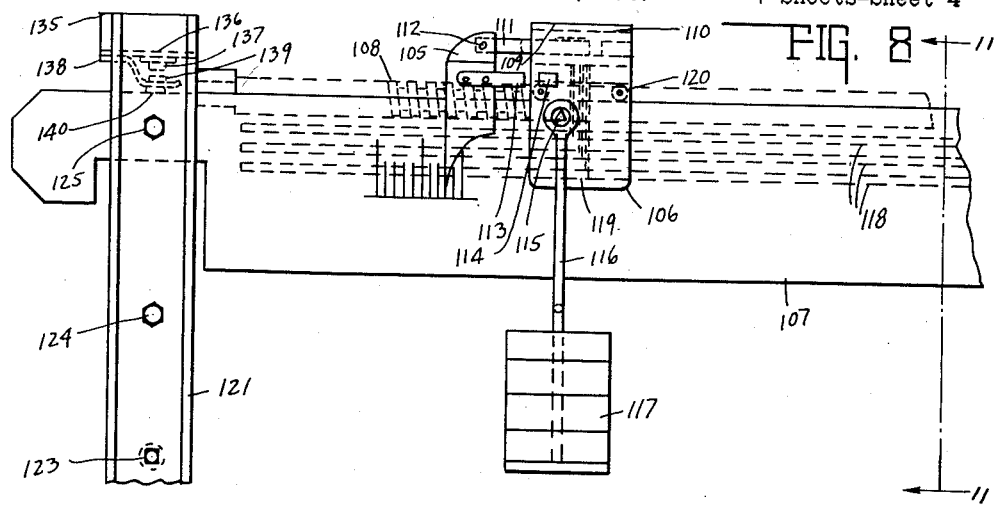
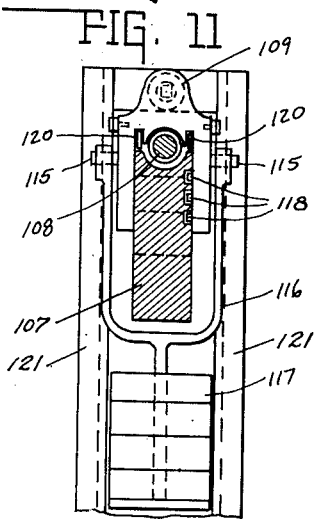
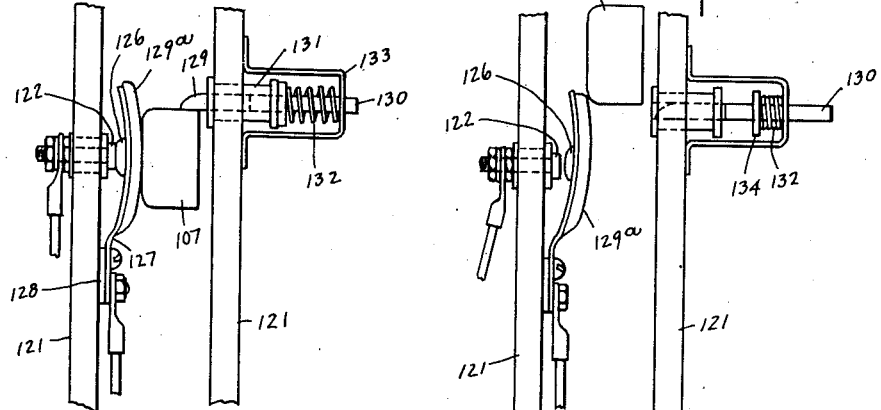
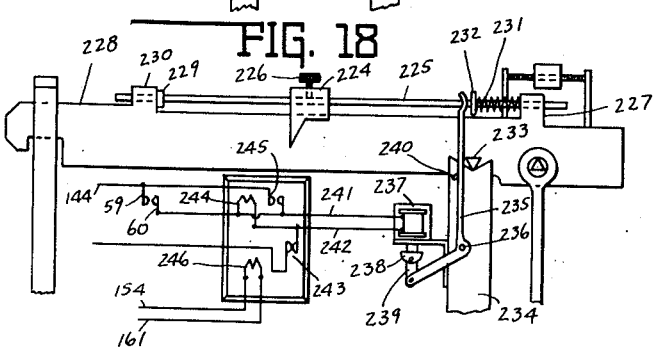
INVENTOR.
ROBERT E. ROBB,
BY Lockwood & Lockwood
Goldsmith & Gall
ATTORNEYS.

June 16, 1936.    R. E. ROBB    2,044,017
APPARATUS FOR PROPORTIONING AND WEIGHING BATCH WEIGHTS
Filed June 28, 1929    7 Sheets-Sheet 5
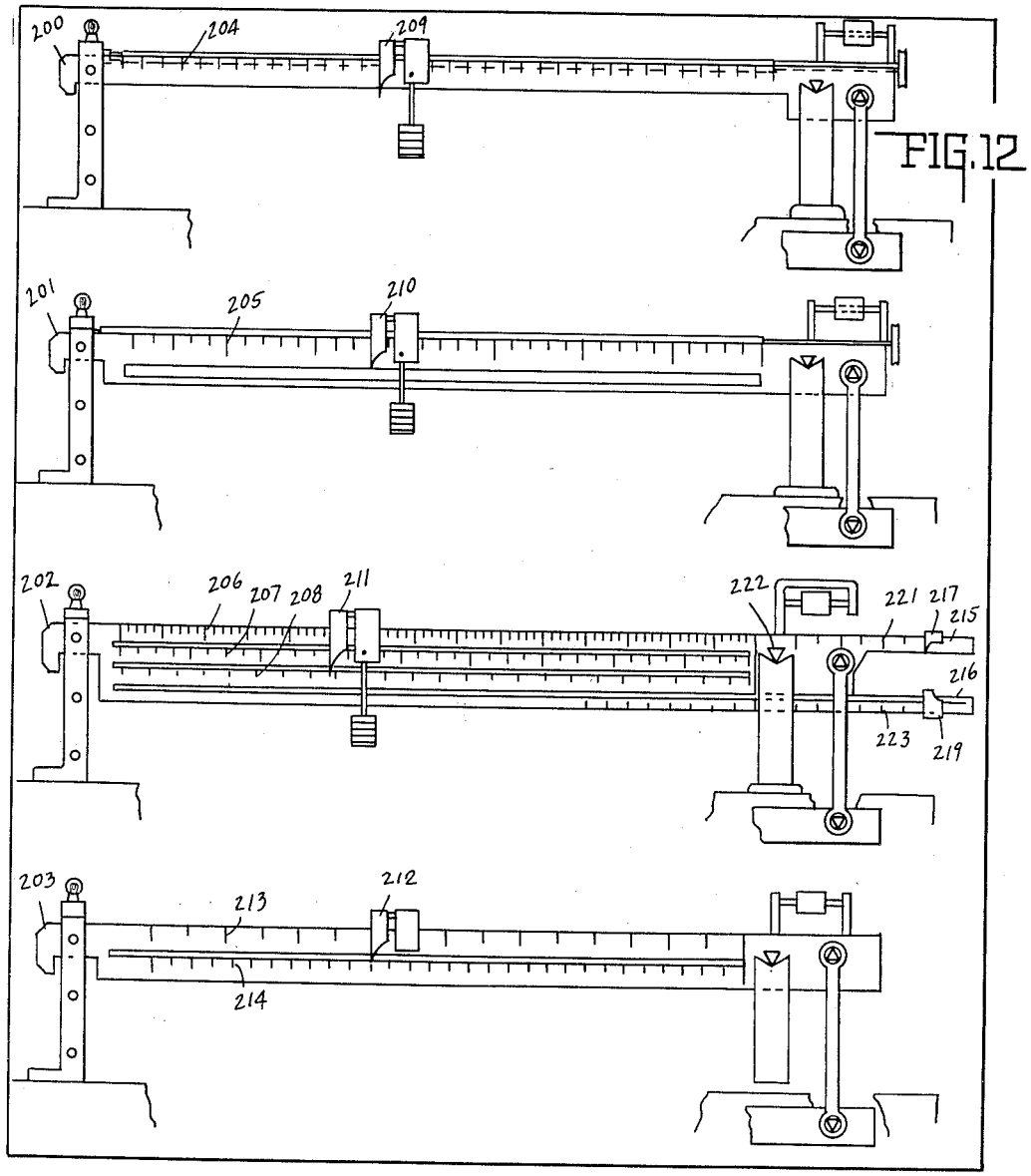
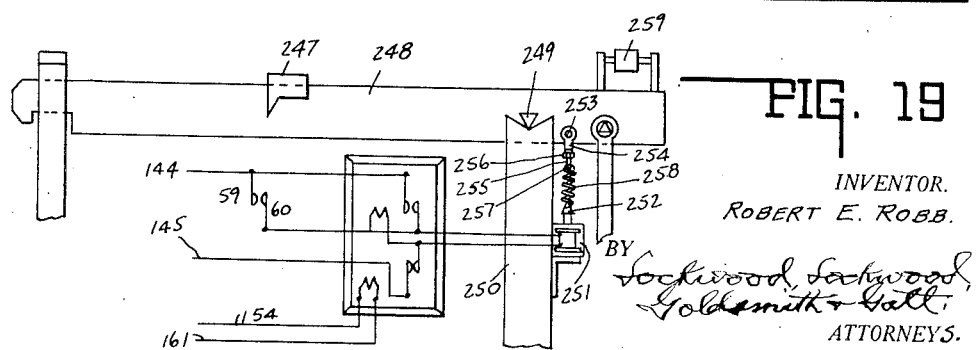
INVENTOR.
ROBERT E. ROBB.
BY Lockwood, Lockwood,
Goldsmith + Gall,
ATTORNEYS.

June 16, 1936.  R. E. ROBB  2,044,017
APPARATUS FOR PROPORTIONING AND WEIGHING BATCH WEIGHTS
Filed June 28, 1929  7 Sheets-Sheet 6
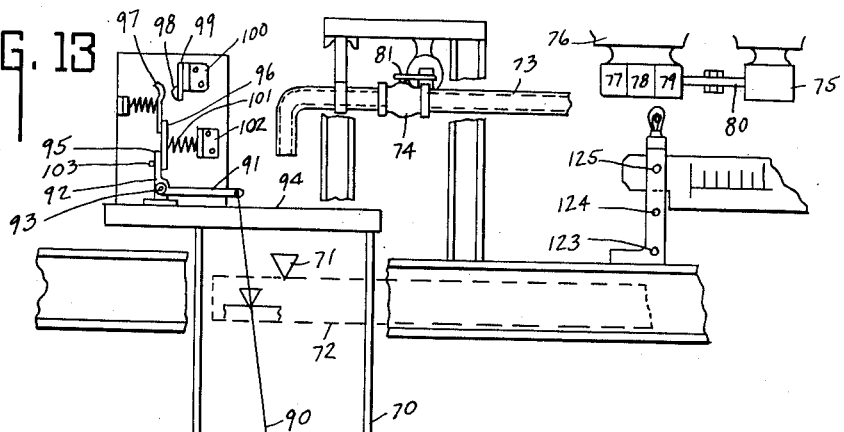
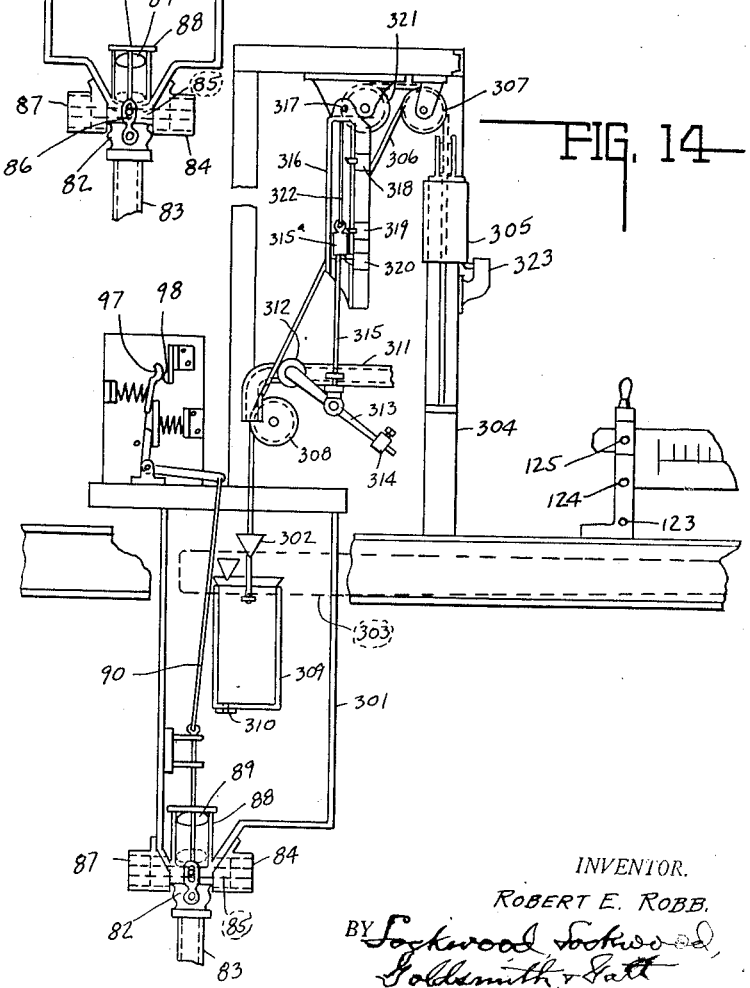
INVENTOR.
ROBERT E. ROBB.
BY Lockwood Lockwood
Goldsmith & Galt
ATTORNEYS.

June 16, 1936. R. E. ROBB 2,044,017
APPARATUS FOR PROPORTIONING AND WEIGHING BATCH WEIGHTS
Filed June 28, 1929 7 Sheets-Sheet 7
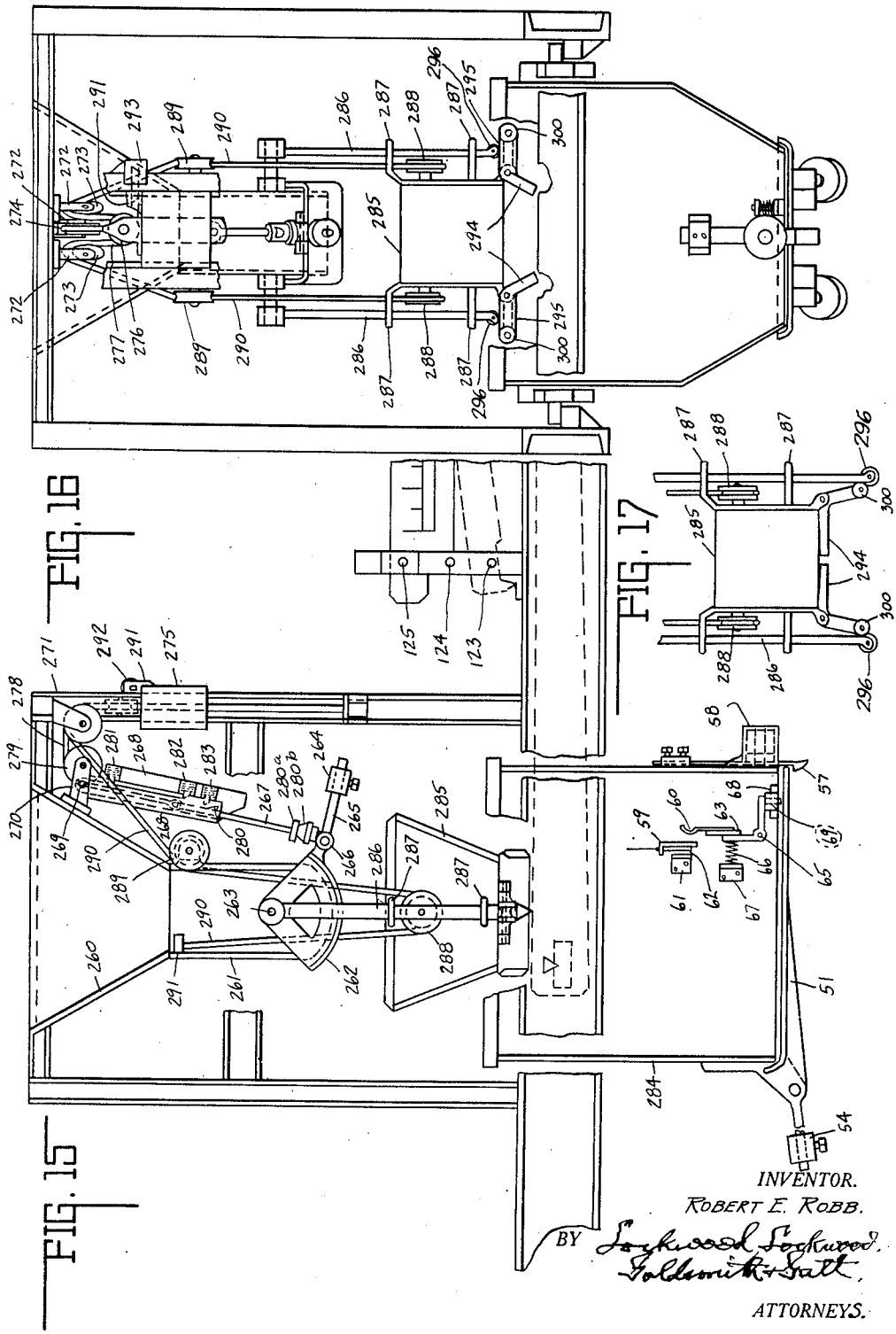
INVENTOR.
ROBERT E. ROBB.
BY
ATTORNEYS.

Patented June 16, 1936

2,044,017

UNITED STATES PATENT OFFICE 2,044,017

APPARATUS FOR PROPORTIONING AND WEIGHING BATCH WEIGHTS

Robert E. Robb, Evansville, Ind.

Application June 28, 1929, Serial No. 374,440

19 Claims. (Cl. 249—22)

This invention relates to apparatus for accurately and expeditiously weighing a batch of material from a flowing source and proportioning a plurality of batches of dissimilar material from flowing sources. More particularly it relates to apparatus for accurately proportioning by weight the ingredients in batches for the making of concrete.

In laboratory tests of concrete mixed with varying proportions of ingredients, it has been found that a small variation in proportions, particularly in the ratio of water and cement, often makes a very large variation in the ultimate crushing strength of the finished concrete.

Heretofore it has been the practice to group the storage bins containing the various ingredients required for concrete in such a manner that the proper amount of each ingredient required for a batch may be received in a weighing hopper beneath each bin and then be dumped simultaneously into a container,—usually a truck below the weighing hoppers. The truck then transports the ingredients to a mixing machine of the batch-mixing type. The weighing of the ingredients required for a batch heretofore has been performed by manual control of the gates admitting each ingredient from its bin to the weighing hopper.

In the weighing of the ingredients as described in the foregoing paragraph, several serious errors may enter:

The first is the human factor in the manual weighing of each ingredient. To weigh hundreds of batches with even a moderate degree of accuracy requires an operator of long experience and one who can be trusted conscientiously to perform his duties.

A second error is due to the kinetic energy of the supply of material entering the hopper when weighing from a flowing source. This gives an apparent weight to the material in the hopper which is always more than the true weight until the flow of material has ceased.

A third serious error is the fact that no method is usually provided for compensating for the moisture contained in the sand and coarse aggregate. These errors, with present production methods, make it impossible to approach the accurate control of final properties of concrete which are obtained in the laboratory.

A volumetric method of proportioning ingredients for concrete is sometimes used but is subject to even more serious errors than those enumerated. The volume of a given quantity of sand, for instance, varies with the moisture in the sand according to an extremely irregular law. No simple method can, therefore, be used for compensating for water contained in the sand when volumetric measurements are used.

Volumetric measurements of coarse aggregate are also inaccurate since the volume occupied by a given weight of coarse aggregate depends upon the manner in which it is packed in a container. A given container will contain much more material if it is tamped or shaken down than if the material is simply poured into the container.

The principal object of the present invention is to provide apparatus for batch-weighing which simply and expeditiously makes corrections for the amount of water or other adulterants carried in the material to be weighed and which eliminates the human factor and the kinetic energy factor in the weighing.

Another object of the invention is to provide apparatus for batch-weighing of the ingredients of a mixture by which the true proportioning of the ingredients is obtained even though one or more of the ingredients contains a percentage of another ingredient.

Another object of the invention is to provide apparatus for control whereby none of the ingredients of a mixture can be discharged from their weighing hoppers if there is an excess of a critical ingredient in one hopper or a deficiency of another ingredient in its hopper.

One feature of the invention results in the weighing of batches at a greater speed than has been accomplished heretofore.

Another feature of the invention results in fewer operators being required than heretofore.

The operation of the apparatus herein described may be summarized as follows:

1. The scale beam weight for each ingredient is properly positioned for the desired quantities of that ingredient, and auxiliary loading devices for the scale beam are added to compensate plus as well as minus for the known percentage of water contained in the several ingredients. The scale gradations and weights are so proportioned that the operator is enabled to set the weights and auxiliary devices therefor without numerical computations when the amount of each ingredient required and the percentage of water therein is known.

2. The material is supplied rapidly to each of the weighing hoppers in a continuous flow. Simultaneously with the start of the material flow, the scale for each ingredient is automatically adjusted to give a reaction when an amount of that material has entered the hopper, which amount is less than the final desired amount.

The scale reaction may take the form of a movement of the scale beam or some related member of the scale assembly.

3. This reaction is utilized to cause a decrease in the rate of material flow into the hoppers and to automatically readjust the scales to give a second reaction just before the final desired weight is obtained.

4. The second reaction is utilized to reduce still further the rate of flow of material into the hoppers to such a point that the kinetic energy of the moving material is negligible.

5. The attainment of the final desired weight for each hopper auotmatically stops the flow of material to that hopper.

Thus a progressive diminution and final stoppage of the flow of material is obtained by means of scale reaction controlled by the weight of the material in the hoppers. In the weighing of small batches of material and in certain other cases, it will be possible to omit one of the reductions in material flow, and, in other cases, it may be necessary to use three or more reductions in flow. It is to be understood that the present invention does not reside in the actual number of reductions in flow which are used.

6. The material is discharged from the hoppers when at least the proper amount of one ingredient, such as cement, and no more than the proper amount of other ingredients, such as sand, water or coarse aggregate, are present in the hoppers.

The full nature of the invention will appear from the attached drawings and the following description and claims.

In the drawings, Fig. 1 is a plan view showing the arrangements of the bins for storing the sand, coarse aggregate and cement and the tank for storing water.

Fig. 2 is an electrical wiring diagram illustrating the electrical inter-control of the operation of one embodiment of the invention.

Fig. 3 is an elevational view of one form of the gate mechanism and weighing hopper used for sand, coarse aggregate and cement.

Fig. 4 is an elevational view of the same taken at right angles to Fig. 3.

Fig. 5 is a plan view of the gate mechanism shown in Fig. 3.

Fig. 6 is an enlarged view of a part of Fig. 5.

Fig. 7 is an enlarged view of a part of Fig. 3, showing solenoids operating the gate mechanism and electrical contacts whose purpose and operation will be hereinafter described.

Fig. 8 is an elevational view of the end of the weighing beam used for each weighing hopper and illustrates one form of counterpoise used thereon.

Fig. 9 illustrates an electrical contact which is operated by the weighing beam shown in Fig. 8 in its upward travel.

Fig. 10 is another view of the electrical contact shown in Fig. 9 and illustrates the position of the parts when the said contact is in the non-operative position.

Fig. 11 is an elevational view of the counterpoise shown in Fig. 8 and taken on the line 11—11 of Fig. 8.

Fig. 12 is an elevational view of the four scale beams used for the sand, coarse aggregate, water and cement and illustrates the graduations thereon.

Fig. 13 illustrates one form of the weighing hopper used for the water.

Fig. 14 illustrates a variation of the water hopper of Fig. 13.

Fig. 15 is an alternative form of weighing hopper for use with the solid ingredients.

Fig. 16 is a view of the same mechanism as Fig. 15 taken at right angles thereto.

Fig. 17 is a view of several of the parts of Fig. 16 shown in the oppposite phase of their operation from that shown in Fig. 16.

Fig. 18 illustrates an alternative apparatus for adjusting the counterpoises to cause an initial scale beam reaction.

Fig. 19 illustrates a second alternative apparatus for causing the initial scale beam reaction.

*Method of setting scale weights*
Fig. 12 illustrates the four scale beams used for the four ingredients necessary for concrete. The beam 200 is used for weighing sand, 201 for weighing coarse aggregate, 202 for weighing water and 203 for weighing cement. The proportions of each of the ingredients to be used in a mix may be expressed in several different ways. A common manner is to specify the number of bags or pounds of cement per batch, the number of pounds of sand and coarse aggregate per batch and the number of pounds or gallons of water per bag of cement. The beams 200 and 201 are marked with graduated scales 204 and 205 which are graduated in pounds and are calibrated to give weights ranging from zero to the maximum amount of sand or coarse aggregate per batch. The water beam 202 carries three scales, 206 being graduated in pounds per bag, 207 being graduated in gallons per bag and 208 expressing the proportion of cement and water in terms of the weight ratio. The cement beam carries two scales, 213 graduated in bags and 214 graduated in pounds.

Each of the counterpoises 209 on the sand beam, 210 on the coarse aggregate beam and 211 on the water beam is here shown split in two relatively movable parts for a purpose which will be hereinafter set forth. Depending from a knife edge 115 on each of these three counterpoises at the combined center of gravity of the two parts when in closed relation, there is a yoke 116 which is adapted at its lower end to receive removable weights 117. The counterpoise 212 on the cement beam is also split but carries no depending weights.

On the water beam there are two extensions in the negative direction 215 and 216. The extension 215 carries a small counterpoise 217. Similarly the counterpoise 219 is carried on the extension 216. The counterpoise 217 is associated with a scale 221 which extends on the negative side only of the fulcrum point 222. Associated with the counterpoise 219 is a scale 223 which extends on both the positive and the negative side of the fulcrum point 222.

In the operation of setting the various counterpoises above described, the known quantities usually are the number of bags of cement per batch, the number of pounds or gallons of water desired per bag of cement, the number of pounds each of sand and coarse aggregate required per batch and the percentage of water carried in the sand and coarse aggregate. The water percentages may be determined by means of the moisture meter described in my co-pending application Serial No. 298,945, filed August 11, 1928, or by any other convenient method.

For purposes of illustration, assume that the following data has been given:

| | |
|---|---|
| Bags of cement in batch | 5 |
| Gallons of water per bag of cement | 6 |
| Pounds of sand | 2,000 |
| Pounds of coarse aggregate | 2,200 |
| Percentage of moisture in sand | 5% |
| Percentage of moisture in coarse aggregate | 4% |

The setting of the counterpoises will be accomplished as follows: Counterpoise 209 on the sand control will be set at the figure 2,000 which would normally cause to be weighed out 2,000 pounds of material. Since there is 5% moisture in the sand, it will be necessary in order to secure the desired amount of dry sand actually to weigh out 5% more of the wet material. To do this, a weight 117 is added to the counterpoise weighing 5% of the weight of the counterpoise itself and being clearly so marked. Other weights of corresponding mass are provided for other percentages of moisture.

Similarly, the counterpoise 210 on the coarse aggregate beam is set at 2,200, and a weight is added, weighing 4% of the weight of said counterpoise.

The counterpoise 211 on the water beam is set at 6 gallons per bag. This would normally cause only six gallons of water to be weighed, so four weights are added, each equal to the weight of said counterpoise to give the desired weight of water for the five bags of cement. Since the sand and the coarse aggregate have each supplied to the batch a certain amount of moisture, this must be subtracted from the amount of water to be weighed out. To compensate for the water in the sand, the counterpoise 217 and the scale 221 are used. This scale is graduated in pounds corresponding to the total number of pounds of sand used in a batch. Removable counterpoises are used of varying weights, each one being of the proper weight to compensate for a given percentage of moisture in the sand when placed on the scale gradation reading the total amount of sand in the batch. For example, in the case assumed, a counterpoise marked 5% would be placed on the scale gradation marked 2,000 pounds on the scale 221. Similarly, a counterpoise marked 4% would be placed on the scale gradation marked 2,200 pounds on scale 223 to compensate for the moisture in the coarse aggregate. It sometimes occurs when coarse aggregates made up of limestone or some other similar material are used that the coarse aggregate, instead of showing a moisture content shows an absorption factor. This is compensated for by placing the counterpoise 219 at the proper position on the positive side of the scale 223.

The counterpoise 212 on the cement scale beam is set at five bags to give the proper weight of cement.

The operator is thus enabled to set the six counterpoises accurately and expeditiously, correcting for the moisture in the solid ingredients without computation and with a minimum chance of error.

The aforesaid method of setting the counterpoises is independent of the automatic weighing feature hereinafter described and may be used as well with the manual system of weighing. It is also applicable to other mixtures beside concrete, in fact to any mixture one or more of whose ingredients contains a greater or less amount of another ingredient.

Solenoid operated weighing hoppers for solid ingredients

In the drawings referring particularly to Fig. 1, the numeral 30 indicates a storage bin for sand. Thirty-one is a storage bin for coarse aggregate, 32 is a storage bin for cement and 33 the water storage tank.

In Figs. 3 and 4, 34 indicates the bottom of a storage bin which may be either the sand, coarse aggregate or cement bin. A disk form of gate 36 closes the outlet from the bin 34 and is mounted on a vertical shaft 37 and rigidly connected thereto. The shaft 37 is supported in bearing members 38 and 39. Rigidly connected to the shaft 37 are arms 40, four in number and positioned in staggered relation, one above the other as shown most clearly in Fig. 7. Four solenoids, 41, 42, 43 and 44 are pivotally supported on bracket members 45 which in turn are supported from the main supporting framework 46 of the storage bin. Each of the foregoing solenoids carries a plunger 47, each of which is connected by means of a bolt 48 with a slotted hole 49 in one of the arms 40. The staggered arrangement of the arms 40 is such that the gate 36 partially covers the outlet opening of the bin when solenoid 43 is operated, closes the opening still farther when solenoid 42 is operated and closes the opening completely when solenoid 41 is operated. When all of the solenoids 41, 42 and 43 are de-energized and solenoid 44 is energized, the gate 36 completely opens the opening and allows the free flow of material from the bin 34. Thus by the foregoing arrangement of solenoids, the flow of material may be progressively checked by the successive operation of the solenoids, the first operating solenoid 43 cutting down the flow by approximately 50%, the second operation solenoid 42 cutting the flow to a very small amount and the third operating solenoid 41 stopping the flow completely.

Above the gate 36 is a neck 48 which forms a continuation of the bin 34. Attached to the side of this neck is an electrically operated vibrator 49 which is used to insure the flow of material when the gate has been partially closed. Below the gate 36 is a weighing hopper 50 having a dump bottom 51 which is pivoted about shaft 52 supported on the hopper 50 by the bearings 53. A counterweight 54 maintains the gate in normal closed position when no material is in the hopper. The hopper 50 is supported on the knife edge 55 which in turn rests on the weighing beam 56 of the usual type of scale mechanism. The latch 57 maintains the hopper bottom in closed position when material is contained therein. A solenoid 58 operates to release the latch when it is desired to dump material from the hopper.

Supported on the side of the weighing hopper 50 is a switch unit comprising two electrical contacts 59 and 60. The contact 59 is supported on the hopper in stationary relation therewith by the member 61 and a suitable insulation piece 62. The switch member 60 is supported on insulation piece 63 which is in turn supported by bell crank 64 which is pivotally supported on the hopper by the pin 65. A spring 66 abutting at one end against the bell crank 64 and at the other end against the member 67 rigidly mounted on the hopper 50 normally retains the contact in open position. Supported in a bearing member 68 and contacting with one end of the bell crank 64 is a pin 69. The hopper bottom 51 is arranged to contact with and elevate the pin 69 when no material is in the hopper. This engagement of the hopper bottom with the pin causes the closing of the contact members 59 and 60. When material has begun to drop into the hopper, the action of the counterweights is overcome, the bottom drops away from the pin 69, a distance sufficient to open the contact 59 and 60 before the hopper bottom is stopped by the latch 57. Thus a contact is made at the points 59 and 60 only when the hopper is completely emptied. The function of this contact in the operation of the mechanism will hereinafter appear.

Solenoid operated water hopper

Referring to Fig. 13, a weighing tank 70 is supported by the knife edge 71 resting on the weighing beam 72 of the usual type of scale apparatus. A pipe 73 connects to the water tank 33 or other suitable water supply, a solenoid operated valve 74 is included in the pipe 73 for controlling the flow of water to the weighing hopper 70. The solenoid control for this valve consists of a solenoid 75 and a solenoid 76 having three windings, 77, 78 and 79. A common plunger 80 for these solenoids is attached to the valve lever 81. In the operation of this valve, the energizing of the solenoid 75 pulls the plunger 80 to a position which opens the valve 74 to a complete opening. When solenoid 75 is de-energized and winding 79 is energized, the plunger 80 is partially returned to partially close the valve. When the winding 78 is energized in addition to the winding 79, the valve is still farther closed. When winding 77 is energized in addition to windings 78 and 79, the valve is completely closed, stopping the flow of water to the weighing hopper 70. Thus a progressive control of the flow of water is obtained similar to the progressive control of the flow of the solid ingredients hereinbefore described.

At the bottom of the weighing hopper 70 there is a solenoid operated outlet valve 82 connected with a discharge pipe 83.

In the operation of the valve solenoid 84 acting through plunger 85 and lever arm 86 acts to open the valve and solenoid 87 acting through the same plunger and lever arm operates to close the valve.

Contained in a cage 88 at the bottom of the weighing hopper 70 is a float 89. A cord 90 is connected at one end to the float 89 and at the other end to the lever 91 of a bell crank 92. The bell crank is pivotally supported on a pin 93 which is in turn supported on the top 94 of the weighing hopper 70. Supported on the upraised arm 95 of the bell crank 92 is an insulation piece 96 carrying an electrical contact piece 97 adapted to contact against an electrical contact piece 98 when the cord 90 is pulled down by the float 89. The contact piece 98 is supported on an insulation piece 99 which is in turn supported on a part of the top member 94 by the member 100. A spring 101 abuts at one end against the insulation piece 96 and at the other against a member 102 rigidly mounted on a part of the member 94. The spring 101 serves to maintain the contacts 97 and 98 only when the weighing tank is completely emptied and the float 89 has dropped to its lowest position. The function of this contact in the control of the apparatus will hereinafter appear.

Split counterpoise operation

In Fig. 1, the location of the scale beam housing is indicated by the numeral 104. Contained in this housing are the four scale beams shown in Fig. 12 for the four ingredients of the concrete. Each of these beams carries a counterpoise which, in the embodiment shown in Fig. 8, includes a member 105 and a relatively movable member 106. The member 105 is moved along the scale beam 107 by means of a screw shaft 108 and is held thereby at any desired position on the scale beam. Other suitable means of moving member 105 and locking it in place may be used. Included in the member 106 are two solenoids 109 and 110 operating upon a common plunger 111 which is pivotally connected to the member 105 by the pin 112. The energizing of the solenoid 109 operates to cause the plunger 111 to center itself in the solenoid and therefore drives apart the two members 105 and 106 to the position shown in Fig. 8. When solenoid 109 is deenergized and solenoid 110 is energized, the plunger 111 attempts to center itself on the solenoid 110 and the member 106 is therefore drawn to the left into abutting relation with member 105. A spring latch member 113 carried on the member 105 loosely engages a block 114 carried on the side of the member 106 to prevent accidental parting of the members 105 and 106 when both solenoids are deenergized.

Carried in longitudinal slots in the side of the scale beam are electrical conductors 118 which operate with sliding contacts 119 to supply current to the solenoids 109 and 110. The member 106 is mounted on rollers 120 which roll upon the top of the scale beam 107 and thus reduce to a minimum the frictional resistance to the movement of the member 106 along the scale beam.

By the split counterpoise mechanism just described it is possible to set the counterpoise at a given gradation and thereafter by operation of the solenoids to move the two sections of the counterpoise into abutting or separated positions. When in the separated position the scale beam will react before the amount of material corresponding to the given gradation has entered the hopper. When in the abutting position the normal scale beam reaction is obtained.

Scale beam electrical contacts

Adjacent the free end of each scale beam 107 are upright members 121, one on each side of the scale beam. Carried on one of the upright members 121 and suitably insulated therefrom are stationary contact pieces 122, three of which are used at the points indicated by 123, 124 and 125 in Fig. 8. Associated with each of the stationary contacts 122 is a movable contact 126 carried on a leaf spring 127 mounted in turn upon an insulation piece 128 supported upon the upright member 121. Carried on the back of the leaf spring 127 is an insulation piece 129a which contacts with the scale beam 107 in its travel in such a way that when contact is made between the insulation piece 129a and the scale beam 107, electrical contact is made between contact pieces 122 and 126 as shown in Fig. 9. When no such contact is made, no electrical contact obtains between points 122 and 126 as shown in Fig. 10.

Adjacent the lowermost switch 123 of the type described in the preceding paragraph is a solenoid operated latch comprising a latch member 129 of magnetic material, a stem 130 of nonmagnetic material, and a solenoid 131 surrounding the member 129 and supported upon the second upright 121. A spring 132 surrounds the non-magnetic stem 130 and abuts at one end against the fixed yoke 133 carried on the upright 121 and at the other end against a collar 134 rigidly attached to the non-magnetic stem 130. In the operation of this latch therefore, the spring 132 normally maintains the latch member 129 in the position shown in Fig. 9 and prevents the up-travel of the scale beam 107. When the solenoid 131 is energized, the magnetic latch member 129 attempts to center itself in the solenoid and therefore is withdrawn from the path of travel of the scale beam 107.

Carried across the top of the two upright members 121 is a cross-member 135 carrying an insulation piece 136 which in turn supports a contact member 137 and a leaf spring 138. The leaf spring carries a contact member 139 and an insulation piece 140 which is so placed as to be struck by the scale beam 107 at the extreme upward limit of its travel. The contact of the scale beam with this insulation piece presses together the two contact pieces 137 and 139 causing electrical contact therebetween for a purpose as hereinafter set forth.

*Operation with solenoid operated hoppers and split counterpoise*

The foregoing specifications complete the description of one form of the apparatus which may be used in carrying out the method of weighing. The operation of this apparatus may best be described by referring to the electrical control.

Fig. 2 shows the wiring diagram for the control of the apparatus described. In this diagram contacts and solenoids are indicated by the same numbers as in the foregoing descriptions. The control is divided into four parts for the four ingredients of the mixture. Where similar elements having similar functions are used in each ingredient control, similar numbers will be used for all controls and will be differentiated where necessary by a statement as to which of the controls is under consideration.

In the wiring diagram a knife switch 141 is shown connected to a main supply line 142 and a main return line 143 which may be connected to any suitable source of alternating or direct current. Connected through the switch with the main supply line 142 is a common feed line which is numbered 144 in all of its branches. Connected to the other side of the switch 141 is a common return line which is numbered 145 in all of its branches. Referring to the cement control a branch of the main feed line 144 is connected to the contact 137. The mating contact 139 is connected to a line 146. A tell-tale light 147 is connected to the line 146 and to one branch of the common return 145. It will be remembered that the contacts 137 and 139 are closed only when the scale beam 107 has reached the extreme upper limit of its travel. In the case of the cement control, therefore, the line 146 will be in positive contact with the line 144 only when the desired amount of cement is in the weighing hopper. The tell-tale light 147 will therefore be lighted only when sufficient cement is in the hopper and will indicate by the absence of light when there is a deficiency of cement in the hopper.

Referring to the sand control, coarse aggregate control and water control, each of these controls has a similar contact 137 connected to a branch of the main feed line 144 and a similar mating contact 139. Each of the contacts 139 is connected to a tell-tale lamp 147 by a line 148 and each of the tell-tale lamps is connected at the other side to a branch of the common return line 145. Connected in parallel with each of the tell-tale lamps on the three controls under consideration is a solenoid 149 operating to open a normally closed contact 150. The normally closed contacts 150 are in series in the line 146 which leads to a push button 151. The switches 137—139 on these three controls are so positioned that contact is made only when there is an excess of sand, coarse aggregate or water in the hoppers. When one of these switches is closed one of the solenoids 149 will operate to open its contact 150 and break the line 146 preventing the passage of current to the push button 151. At the same time the proper tell-tale lamp will be lighted to indicate which of the hoppers is overweight.

On each of the three controls for the sand, coarse aggregate and cement, there is a solenoid 58 which operates to dump the material from the hopper. On the water control is a solenoid 84 which operates to open the dump valve and dump the water hopper. Connecting the push button 151 with one terminal of each of these solenoids is a line 152. The opposite terminal of each solenoid is connected to a branch of the common return line 145. A complete circuit is therefore set up for each solenoid when contact 137—139 on the cement control is closed indicating sufficient cement, when the similar contacts on the other three controls are open indicating that there is no excess of the other three ingredients and when the push button 151 is manually operated. When this circuit is completed all four hoppers will dump their contents.

Referring to the sand control, coarse aggregate control and cement control, it will be remembered that the dumping of each hopper causes the dump bottom to fly back and close the contact at points 59 and 60. The contact 59 in each case is connected to a branch of the main supply line 144, the contact 60 being connected to a line 153. Connected in parallel with the line 153 and a branch of the main return line 145 are the solenoids 44 and 109 which open the gates allowing material to flow from the bins into the hoppers and which move the counterpoise member 106 into the separated position with respect to the member 105. With the counterpoise in this position, the scale beam will start its upward travel when an amount of material less by a predetermined amount than the desired final weight is in the hopper.

When sufficient material has entered each of the three hoppers under consideration the dump bottom drops sufficiently to break the contacts at 59—60 thus de-energizing the solenoids under the control of these contacts. A further flow of material into the hoppers causes the scale beam to start its upward travel and to make contact at the lowermost switch 123 carried on the upright members 121 associated therewith. The solenoid operated latch 129 described hereinbefore and shown in Fig. 9 prevents the further upward travel of the scale beam at this time. One of the contacts of the switch 123 is connected to a branch of the main supply line 144, the opposite side being connected to a line 154 which leads in turn to the solenoids 110, 156 and 43. The opposite terminal of each of these solenoids is connected to a branch of the main return line 145 through a line 161 and a normally closed contact 159. The closing of switch 123 therefore energizes these solenoids. Solenoid 110 causes the two sections of the counterpoise to draw together. Since this increases the effective lever arm of the counterpoise, the scale beam again drops to its initial position.

Solenoid 43 causes a partial closing of the bin gate and thereby reduces the amount of material flowing into the hopper. Solenoid 156 is arranged to close a normally open switch 157 which is connected at one side to a branch of the main feed line 144 and at the other to the line 154. This contact therefore parallels switch 123 and maintains power on the three solenoids even after the scale beam has returned to its initial position opening switch 123. The three solenoids are de-energized when the normally closed switch 159 is opened at a later time in the process.

Associated with solenoid 43 as shown in Fig. 7 and indicated in the wiring diagram is a contact 162 suitably insulated and arranged to contact with a second contact 163, also suitably insulated, when the plunger of solenoid 43 has neared the end of its travel. The contact 162 is connected to a branch of the common supply line 144 and the mating contact 163 is connected to the solenoid 131 which moves the latch member 129 from the path of travel of the scale beam as previously described. The opposite terminal of this solenoid is connected to a branch of the common return line 145 so that the closing of contact 162—163 causes the energizing of this solenoid and consequently the scale beam is free to complete its travel when sufficient material has entered the hopper to again start its upward motion.

It is a characteristic of the ordinary type of scale beam that it will start to rise before the final amount of material is in the weighing hopper and will gradually approach the horizontal position as the weight in the hopper approaches the desired weight.

Before the desired weight of material is in the hopper therefore, the scale beam will again slowly start to rise. In passing, the switch 123 is again closed but no action results since the circuit controlled by switch 123 is already in operation due to the previous closing of contact 157. When the scale beam reaches switch 124 this switch is closed and a circuit is set up as follows: From the main line 144 through switch 124 and a line 164 to one terminal of the solenoid 42. The opposite terminal of the solenoid 42 is connected through the line 161 and the normally closed contact 159 to the main return line 145. Therefore, solenoid 42 is energized and the gate is closed still farther allowing the flow of only a very small quantity of the material into the hopper. Connected in parallel with the solenoid 42 is the vibrator 49 which therefore also operates at this point, insuring a flow of material.

Since the supply of material has been cut down to a very small quantity the scale beam will rise even more slowly until it comes in contact with the switch 125. The closing of that switch energizes solenoid 41 through a line 165, the solenoid 41 being connected at its other end through the normally closed contact 159 to the main return line. The operation of solenoid 41 causes the complete closing of the gate, stopping all flow of material therethrough.

The approach to final closing has been made by gradually reducing the flow until at the final closing of the gate, a mere trickle of material is passing into the hopper. The kinetic energy of this small amount is practically negligible and the time of closing of switch 125 can be adjusted to give an extremely high degree of accuracy in the final weight.

Referring to Fig. 7, the normally closed switch 159 is shown in detail. It consists of a contact member 166 carried on and suitably insulated from the bearing member 38 and a contact member 167 carried on and suitably insulated from a lever arm 168. The lever arm is pivotally mounted on a part of the bearing member 38 by the pin 169. Spring 170 abuts at one end against the lever 168 and at the other end against a projecting portion 171 of the bearing member 38. This spring normally maintains the contacts 166 and 167 in closed relation. Carried on the plunger 47 of the solenoid 41 is a projection 172 adapted to engage the end of the lever 168 near the end of the stroke of the plunger 147 for the purpose of opening the 166—167 contact. The opening of this contact disconnects the solenoids 41, 42, 43, 110 and 156 and the vibrator 49 from the common return line 145 and therefore de-energizes these solenoids as soon as the gate reaches the completely closed condition. The spring 170 is not made strong enough to move the gate mechanism, so contact 159 remains open until the gate has again been opened by solenoid 44.

In the case of the sand control and coarse aggregate control, the travel of the scale beam will be stopped before switch 137—139 is closed. In the case of the cement control, switch 137—139 is so placed that it closes at the same time as switch 125 for that control. This brings these controls back to the original starting point. The wiring for the water control will now be considered.

Closing of the push button 151 operates the solenoid 84 which dumps the water from the weighing hopper at the same time that the material is dumped from the other three hoppers. When the water hopper is emptied, the float valve closes contacts 97—98 as before explained. Contact 98 is connected to the main supply line 144 and contact 97 is connected by a line 158 to the solenoids 87, 109 and 75. Each of these solenoids is connected at its other terminal to a branch of the common return line 145 so that the operation of the float valve simultaneously actuates all three solenoids. Solenoid 87 closes the dump valve, solenoid 109 separates the counterpoise sections on the water control scale beam and solenoid 75 opens the supply valve allowing water to enter the weighing hopper from the water supply tank.

The initial travel of the scale beam of the water control closes its contact 123. This contact is connected at one side to a branch of the main supply line 144 and at the other side to a line 155 which leads successively to one side of the solenoids 110, 156, 79 and 169. The opposite side of each of these solenoids is connected to a branch of the main return line 145 by a line 160 and a normally closed contact 168. Therefore the closing of switch 123 energizes all of these solenoids. Solenoid 110 moves the scale beam counterpoise to the closed position causing the scale beam to drop to its initial position. Solenoid 156 closes the hold-in contact 157 paralleling switch 123 and maintaining the circuits for the four solenoids after the scale beam has dropped. Solenoid 79 partly closes the inlet valve to the weighing hopper cutting down the flow of water. Solenoid 169 closes a normally open contact 170.

One side of the normally open contact 170 is connected to a branch of the main supply line 144 and the opposite side is connected to the solenoid 131 by a line 171. This contact therefore performs the same function as the contact 162—163 of the other three controls and removes the solenoid operated latch 129 from the path of the scale beam 107.

The further addition of water to the weighing hopper causes the scale beam to rise slowly, closing contact 124 which is connected to the winding 78 by a line 172. The opposite side of the winding 78 is connected to the common return line 145 through the line 160 and the normally closed switch 168. It will be remembered that the winding 78 closes the intake valve still further, leaving a very small flow of water entering the hopper.

The further rising of the scale beam closes contact 125 which is connected to the winding 177 by the line 173. The opposite side of this winding is connected to the main return line through the normally closed switch 168 so that the closing of the switch 125 energizes the winding 77 to completely close the intake valve.

At the end of the travel of the plunger 80 the normally closed switch 168 is opened to break the circuit on the solenoids 77, 78, 79, 110, 169 and 156, returning the circuits to their initial situation.

The split counterpoise construction allows the scale beam to react when a weight of material has entered the hopper less by a predetermined amount than the final amount required for the batch. Thus the first step in the progressive shutting off of the supply of material can be accomplished at any desired point in the filling of the hopper. The second of the progressive steps by which the supply of material is diminished allows the final upward travel of the scale beam to be made at an extremely low rate of speed and allows, therefore, accurate adjustment of the final shut-off point as determined by the position of the switch 125. It will also be seen that an accidental over-loading of either the sand, coarse aggregate or the water hopper will prevent the energizing of the hopper dump solenoids and will indicate by means of the telltale lights which of the hoppers is over-loaded. A deficiency of cement in the cement hopper will also operate to prevent the dumping of the hoppers and will be indicated by the absence of the tell-tale light. If desired a normally closed contact may be included in the cement control in exactly the same manner as contacts 150 in the other three controls. In that case a second contact similar to contact 137 would be added to the cement control to be closed only if the cement control were overweight. This added contact would control the contact 150 by means of the solenoid in the same manner as in the other three controls. Thus a dumping of the hoppers would be prevented if the cement hopper is either over or under-loaded.

Other forms of apparatus suitable for use in the method of weighing and their operation will now be described.

*Alternative apparatus to give preliminary scale beam reaction*

Figs. 18 and 19 show two forms of apparatus, each suitable to give the same result as the split counterpoise construction previously described. The result desired, briefly stated, is to impart to the scale beam a preliminary upward motion at a time when an amount of material less by a predetermined weight than the final desired amount is in the hoppers. Referring to Fig. 18, the counterpoise 224 is of unitary construction and is slidably mounted upon the scale beam 228. A rod 225 passes through the counterpoise. A thumb screw 226 is used to clamp the counterpoise to the rod at any desired position. The rod 225 is mounted slidably in bearing members 227 and 230 which form a part of the scale beam 228. A collar 229 fastened to the rod 225 abuts against the bearing member 230 and prevents the travel of the rod in one direction. A spring 231 surrounds the rod at one end and abuts against the bearing member 227 and against a collar 232 fastened to the rod 225. The action of this spring therefore normally tends to maintain the rod 225 at the extreme limit of its travel with the collar 229 abutting against the bearing 230.

The scale beam 228 is mounted on the usual knife edge 233 on an upright support member 234. Pivotally mounted at the point 236 on the upright member 234 is a bell crank member 235, the upper end of which is positioned adjacent the collar 232 with a small space therebetween. Fixedly mounted on the side of the upright 234 is a solenoid 237 having a plunger 238 to which is pivotally attached a link 239. The link 239 is pivotally attached to the lower arm of the bell crank member 235. A travel limit pin 240 limits the travel of the bell crank in one direction. In the action of the solenoid and bell crank mechanism just described, the solenoid is energized, the plunger 238 is lifted rotating the bell crank in a clockwise direction about the point 236. The upper end of the bell crank then comes in contact with the collar 232, depresses the spring 231 moving the rod and counterpoise to the right.

In the operation of this device the counterpoise is first set at the gradation corresponding to the desired weight of material to be weighed out. The solenoid is then energized, moving the counterpoise to the right to a position corresponding to a predetermined smaller weight of material. When this predetermined weight of material has entered the hopper, the scale beam rises, makes contact at the switch 123 as in the previous types of apparatus described. By a circuit to be described this contact cuts the power from the solenoid 237 and thereby returns the counterpoise to its normal position.

The electrical control wiring for the solenoid 237 is also shown in Fig. 18. The contact 59—60 is the same contact designated by these numbers in the previous wiring diagrams. This contact is closed when the dump bottom of the weighing hopper has swung back to the closed position after dumping a load. The contact 59 is connected to a branch of the main feed line 144. The contact 60 is connected to a line 241 which leads to one side of the solenoid 237. The opposite side of the solenoid 237 is connected to a branch of the main return line 145 by a line 242 and a normally closed contact 243. Therefore, the closing of switch 59—60 energizes solenoid 237 and moves the counterpoise to the right.

Connected in parallel with the solenoid 237 is a second solenoid 244 which is energized at the same time and operates to close a normally open contact 245. This contact 245 is in parallel with the 59—60 switch and therefore maintains the power on this circuit even after the 59—60 switch has been opened by the first material entering the hopper as previously described. A third solenoid 246 is arranged to open the normally closed contact 243 de-energizing both the 237 and the 244 solenoids and thereby returning the counterpoise to its normal position. The 246 solenoid is connected at one side to the line 154 and at the opposite side to the line 161. These lines are the same as those designated by the same numbers in the wiring diagram of Fig. 2 and are therefore energized when the switch 123 is closed by the first upward motion of the scale beam. This brings the circuit shown in Fig. 18 back to its initial position and further operation will not take place until the 59—60 switch is again operated after a load of material has been dumped.

Fig. 19 shows another form of apparatus adapted to obtain the same result. In this figure a unitary counterpoise 247 is used. This counterpoise is set at the proper gradation of the scale to give the final desired quantity of material and it is not moved therefrom except to weigh out batches of a different weight. The scale beam 248 is mounted on the usual knife edge bearing 249 on an upright member 250. Attached to the side of the upright member 250 is a solenoid 251 having a plunger 252. Pivotally mounted at the point 253 on the scale beam is a yoke member 254 having a cylindrical stem 255 adjustably mounted therein. A lock nut 256 maintains the stem 255 in any desired adjusted position. At the lower end of the stem 255 is a hole 257 through which is hooked one end of a tension spring 258. The opposite end of the spring is similarly attached to the plunger 252. When the solenoid 251 is not energized the yoke member, stem spring and plunger hang as a dead weight upon the scale beam. This weight is always constant and may be compensated for by the usual form of the adjusting weight 259 or in any other desirable manner. The energizing of the solenoid 251 pulls its plunger down and thus adds to the force acting upon the scale beam an amount equal to the spring tension caused by the plunger movement. The addition of this force will cause the scale beam to rise when an amount of material has entered the hoppers less than the final desired amount. The value of this force can be adjusted by using springs of different constants or, for finer adjustments, by means of the adjusting stem 255 and the lock nut 256. At the time the final weight is being weighed, the solenoid will be released and the only force acting on the point 253 would be the dead weight as before mentioned. Therefore, no error is introduced into the final result by inaccuracy in calibration of the spring 258.

Since the timing of the solenoid 251 will be exactly the same as that of the solenoid 237, described in the preceding embodiment of apparatus, the wiring therefore will be exactly the same as that shown in Fig. 18 and will not be again described in detail.

*Gravity operated hoppers for solid ingredients*

Figs. 15, 16 and 17 illustrate an alternative embodiment of the hopper design previously described. This design may be called the gravity operated hopper since the force used to close the gate is the force of gravity acting upon a heavy weight rather than the action of the solenoids described for the previous type. In this embodiment the bottom 260 of each of the storage bins has a rectangular neck 261 at the bottom thereof which is closed by an arcuate gate 262 pivoted at the point 263 on the side of the neck 261. A counterweight 264 mounted upon an extension 265 of the gate member 262 serves to maintain the gate in a normally closed position. Pivotally attached to the gate member at the point 266 is a rod 267 extending upward and slidably mounted in a guide member 268. The guide member 268 is pivotally mounted at a point 269 upon a bracket member 270 carried on the bin bottom 260. By this construction the rod 267 is free to move up and down in the guide member which, by pivoting about point 269, allows the lower end of the rod 267 to follow the normal arcuate motion of the point 266.

A main supporting framework 271 for the storage bin carries three pulley bearing members 272 in which are mounted a pair of pulleys 273 and a pulley 274 intermediate of the other two. Slidably guided upon the support frame 271 is a counterweight 275. Mounted on said counterweight is a pulley bearing member 276. Pivotally mounted in the member 276 is a pulley 277. Attached to the upper end of the member 276 is one end of a cable 278 which passes over the pulley 274, and thence over another pulley 279 mounted upon the member 270 and is attached at its other end to the upper end of the rod 267. Mounted on the rod 267 is a latch-engaging member 280. Attached to the guide member 268 are three solenoid-operated latches, 281, 282 and 283 of the general type previously described and shown in Figs. 9 and 10. The latches 281 and 282 are positioned to engage the latch-engaging member 280 at different positions of the gate.

A weight 280ª is slidably carried on the rod 267 and carries an annular notch 280ᵇ adapted to engage the latch 283 when the gate is in the fully opened position. In the operation of this part of the apparatus, the counterweight 275 is allowed to fall by means hereinafter described. This falling weight operating through the cable 278 and the rod 267 pulls the gate 262 to its full open position. At this position the latch-engaging member 280 engages the latch 281 at the extreme upward travel of the rod and the latch 283 engages the notch 280ᵇ. The weight 275 may then be raised by a mechanism, which will be hereinafter described, without closing the gate. At the proper time in the cycle for partly closing the gate, the solenoid of latch 281 is energized. The operation of the solenoid latch 281 withdraws the latch and allows the rod 267 to drop under the influence of the counterweight 264 to the second latch position 282. At this position the gate is partly closed and the flow of material therethrough is greatly reduced. At the proper time for still further closing the gate, the solenoid of latch 282 is operated. The operation of solenoid latch 282 allows the rod 268 to drop still further bringing member 280 in contact with the top of weight 280ª. At this point the gate is almost completely closed and only a small amount of material is allowed to pass therethrough. At the proper time for completely closing the gate, latch 283 is operated. The operation of the solenoid of latch 283 allows the gate to close to the final closed position and allows weight 280ª to slide down along the rod 267 imparting a hammer blow to the lever 265 to facilitate the final closing of the gate.

The mechanism for raising the weight 275 will now be described. Below the gate 262 and above the weighing hopper 284 is an auxiliary hopper 285. The hopper 285 is slidably guided by means of the extending members 287 on the guide members 286 which depend from the point 263 on the neck 261. Rotatably attached on opposite sides of the hopper 285 are pulleys 288. Rotatably mounted on the side of the hopper bottom neck 261 are other pulleys 289. A cable 290 is attached to one side of the hopper bottom neck 291 and extends downward around one of the pulleys 288, thence upward to one of the pulleys 289, thence to one of the pulleys 273, thence to the pulley 276 mounted upon the top of the counterweight 275 and returns by means of the other pulleys 272, 289 and 288 to a point corresponding to point 291 on the opposite side of the neck 261. The cable just described therefore operably connects the hopper 285 and the counterweight 275 so that when one is raised the other is lowered. Their weights are adjusted so that the counterweight 275 will be heavier than the hopper 285 when the hopper is emptied but will be lighter than the weight of the hopper and material contained therein when the hopper is partly filled.

Mounted upon the weight 275 is a lug 291 having a rectangular hole therein 292 adapted to engage the latch of a solenoid latch member 293 similar in construction to the latches 281, 282 and 283. The latch 293 is mounted upon the frame work 271 at the upper end of the travel of the counterweight 275. By this arrangement, when the counterweight has once been raised to its upper position, it is held therein until the solenoid of the latch 293 is operated.

The auxiliary hopper 285 is fitted with a dump bottom 294 shown in the open position in Fig. 16 and in the closed position in Fig. 17. The dump bottom is divided into two parts on opposite sides of the hopper, each part having an extending arm 295 carrying at its outer end a roller 300. The lower ends of guide rods 286 carry rollers 296 adapted to roll upon the arms 295 during the lower part of the movement of the auxiliary hopper while the rollers 300 are adapted to roll upon the guide members 286 during the upper portion of said movement. As will be seen from Figs. 16 and 17, when the hopper is raised, as in Fig. 17, this construction causes the dump bottom to be closed. When the hopper is lowered as in Fig. 16, the dump bottom will be open.

The weighing hopper 284 is of the same construction as previously described in Fig. 3 and carries the same type of dump bottom 51, counterweight 54, solenoid operated latch 57, solenoid 58 and operating switch 59—60 as shown and described for Fig. 3.

In the operation of this type of apparatus, assuming all hoppers to be properly filled, the gate 262 will be closed, the counterweight 275 will be held at the upward limit of its travel by the latch 293 and the auxiliary hopper will be at the lower end of its travel with its dump bottom wide open. The manual operation of the solenoid 58 dumps the weighing hopper. When the material is completely out of the hopper, the dump bottom 51 returns to normal position and closes the contact 59—60. The closing of this contact operates solenoid 293 in the same manner and by the same wiring as the solenoid for opening the disc gate was operated in the previously described embodiment. The operation of solenoid 293 allows the counterweight 275 to drop, opens the gate 262 and raises the auxiliary hopper 285 at the same time closing the bottom of the auxiliary hopper. The dump bottom of the auxiliary hopper has an opening between the two halves 294 which permits enough material to fall through to cause the dump bottom 51 of the weighing hopper to drop away and open the 59—60 switch.

When the auxiliary hopper 285 is filled or nearly filled, it over-balances the weight 275, the hopper is lowered and the weight is raised. The weight latches in its uppermost position by the latch 293 and the lowering of the hopper causes the dump bottom 294 to open, allowing the material therein to fall into the weighing hopper. The adjustment of weights is such that this occurs some time before the proper amount of material has been discharged to cause the first motion of the scale beam. The weight 275 is thus raised to its latched position before latch 281 is released for partly closing the gate. When the auxiliary hopper has been dumped it remains in its lower position with its bottom open permitting discharge from the gate 262 directly into the weighing hopper. This position of the auxiliary hopper is continued until the filling of the weighing hopper is complete and another cycle has been started by the release of the counterweight 275.

When the proper amount of material has entered the weighing hopper to cause the said first motion of the scale beam, the switch 123 is operated by the scale beam to energize the latch solenoid 281, partially closing the gate 262 as before described. The rise of the scale beam is checked by the solenoid latch 129 as before described. The operation of closing the split counterpoise, either of the substitute embodiments shown in Figs. 18 and 19, as before described, or some similar mechanism causes the scale beam to drop back to initial position.

Further increase in the material in the hopper causes the scale beam again to rise, closing contact 124 as previously described and energizing the solenoid 282 to close the gate 262 still further. Further increase of material in the hopper to the final desired weight causes the scale beam to close the contact 125 operating solenoid 283 and completely closing the gate 262. The cycle has now been completed and the apparatus returned to the assumed initial position.

*Gravity operated water hopper*

Fig. 14 illustrates a water weighing mechanism which may be substituted for the apparatus shown in Fig. 13 for carrying out the method of this invention. In Fig. 14, weighing hopper 301 is supported on the usual knife edge bearing 302 on the weighing beam 303 of a scale apparatus. A frame work 304 slidably supports a counterweight 305. Rotatably mounted upon the frame work 304 are pulleys 307 and 308. A cable 306 leads from the counterweight 305 over the pulley 307 and the pulley 308 and supports at its lower end a small auxiliary tank 309 which is positioned inside of the larger weighing tank 301. The tank 309 is open at the top and has a small opening 310 at the bottom. The weight of the tank and counterweight are such that the empty tank is lighter than the counterweight while the tank filled with water or nearly filled with water will be heavier than the counterweight.

A water supply pipe 311 fitted with a regulating valve 312 is arranged to discharge water from a reservoir or other supply into the small tank 309. The rate of flow of the water from the discharge line 311 into the small tank is greater than the possible flow of water from the tank out through the small opening 310. Therefore, the tank 309 will be quickly filled when the valve 312 is open and will be emptied when the valve is closed. The valve 312 is fitted with an operating handle 313 carrying counterweight 314 adapted to close the valve. Midway of the arm 313 is pivotally attached a rod 315, the upper end of which has an enlarged portion 315ᵃ slidably mounted in a guide member 316. The guide member 316 is pivotally mounted at point 317 to a part of the supporting frame 304. By this construction, the rod 315 may be moved up and down, sliding in the guide member 316 and the lower end thereof following the normal arcuate travel of its point of attachment to the lever arm 313.

Carried on the guide member 316 are three solenoid operated latches 318, 319 and 320 of the type previously described, adapted to engage the enlarged portion 315ᵃ of the rod 315. Rotatably mounted on a part of the frame 304 is a pulley 321. Attached to the counterweight 305 and passing over the pulleys 307 and 321 and attached to the enlarged portion of the rod 315 is a cable 322. Also mounted on the supporting frame 304 is a solenoid latch 323 of the type previously described adapted to engage the counterweight and normally maintain it in its uppermost position.

At the bottom of the weighing hopper 301 is the same type of solenoid-operated dump valve as used in Fig. 13, having a solenoid 84 for opening the dump valve and solenoid 87 for closing it.

The tank 301 also carries the same type of float-operated switch 97—98 operated by the same float mechanism 88 and 89 used in the type described for Fig. 13.

In the operation of the weighing method using this form of mechanism, assume that water tank 301 contains the proper amount of water for one batch of concrete and the solid ingredient hoppers are filled with the proper amount of material. The valve 312 will be in closed position, the lever arm 313 being in its lowermost position. Counterweight 305 will be in its uppermost position held in place by latch 323. Contact 97—98 will be open. The manual operation of solenoid 84, as previously described, opens the dump valve and allows the water to drain from the weighing hopper 301. When the water is completely drained from the hopper, the float 89 operates to close the 97—98 contact. This contact operates solenoid 87 to close the dump valve and operates the solenoid of the latch 323 allowing the counterweight 305 to drop. The fall of the weight 305 raises the auxiliary tank 309 and raises the lever arm 313, opening the valve 312 to its fullest extent. The latch 318 at this position engages the enlarged portion of the rod 315 and maintains the valve in this position.

Water flowing into the small tank 309 causes it to over-balance the counterweight 305 and therefore to raise the counterweight again to its upper position where it is again held by the latch 323. Water flowing from the small tank 309 through the hole 310 causes the float 89 to rise, opening the 97—98 switch. When sufficient water has entered the weighing tank 301, either by passing through the hole 310 or by spilling over the side of the small tank 309, the scale beam is started on its upward travel. The movement of the scale beam closes switch 123, which, in this embodiment, operates to energize the solenoid of the latch 318, withdrawing the latch and allowing the counterweight 314 to partially close the valve 312. The closing of the valve is stopped by the engagement of latch 319 with the enlarged portion of the rod 315. At this position, the flow of water through the valve 312 is materially decreased.

The upward travel of the scale beam is checked at this point, as previously described, by the latch 129. The scale beam is returned to its initial position by the moving of the counterweights into their closed position, by means of the alternative apparatus shown in Figs. 18 and 19 or by some similar means.

The addition of more water to the tank again causes the scale beam to rise, closing contact 124. In this embodiment, contact 124 operates solenoid 319 and allows the further closing of the valve 312, reducing the flow of water through the valve to a very small amount. Further upward travel of the scale beam closes switch 125, operates solenoid 320 and thereby allows complete closing of the valve 312. The cycle is now complete and the mechanism has returned to the assumed initial situation.

The invention claimed is:

1. In a weighing apparatus having a scale beam, the combination of a counterpoise member adapted to be fixedly positioned upon said scale beam, a second counterpoise member relatively movable with respect to said first member, a solenoid winding carried by one of said members, a solenoid plunger carried by the other of said members, and means for automatically energizing said solenoid winding to cause relative motion of said members.

2. In a weighing apparatus having a scale beam, the combination of a counterpoise member adapted to be fixedly positioned upon said scale beam, a second counterpoise member movable relatively of said first member, a pair of solenoid windings carried by one of said members, a solenoid plunger carried by the other of said members, and means for energizing said solenoid windings whereby the actuation of one of said windings causes motion of said members toward each other and the actuation of the other of said windings causes motion of said members away from each other.

3. In a weighing apparatus having a weighing container and a gate adapted to control the flow of material to said container, the combination of a member movable in response to the weight of material in said container, means for adjusting said member to move in one direction when a predetermined weight of material has entered said container, a control element operable by said movement of said member to partially close said gate, to move the member in the opposite direction and simultaneously to adjust said member to give a second movement in the first direction upon the attainment of a second predetermined weight of material in said container, and a second control element operable by said second movement of said member to completely close said gate.

4. In a weighing apparatus having a weighing container and a gate adapted to control the supply of material to said container, the combination of a member movable in response to the weight of material in said container, means for adjusting said member to move when a predetermined weight of material has entered said container, a control element actuatable by the movement of said member to partially close said gate and to change said adjustment to return said member to initial position, a second control element, limiting means for limiting the travel of said member to prevent engagement therewith with said second control means, and means for removing said limiting means from the path of said member upon its return to initial position, whereby a second movement of said member engages said second control element to cause a second movement of said gate.

5. In a weighing apparatus having a weighing hopper, the combination of a hinged bottom for said hopper, a latch for supporting the weight of said bottom and material contained in said hopper, means for elevating the said bottom out of contact with said latch when said hopper is empty, and a control element engageable by said bottom when out of contact with said latch to initiate the flow of material to said hopper.

6. In an apparatus for weighing the ingredients of a mixture, the combination of a weighing container for each ingredient, means for dumping each of said containers, a latch for each of said dumping means normally restraining the operation thereof and means responsive to the weight of material in one of said containers adapted to prevent the release of the said latches on all of said containers when the weight of said material is greater than a predetermined weight.

7. In an apparatus for weighing the ingredients of a mixture, the combination of a weighing container for each ingredient, an electrically-operated latch for each container adapted to dump the ingredients therefrom, an electrical contact element operable in response to the weight of material in one of said containers to open the circuit to all of said electrically-operated latches to prevent actuation thereof when the weight of said material is greater than a predetermined weight.

8. In a weighing apparatus having a weighing container and a gate adapted to control the flow of material to be weighed, the combination of a vertically movable auxiliary container adapted to receive material from said gate, a counterweight, a connection between said counterweight and said auxiliary container whereby said auxiliary container is raised by the fall of said counterweight when said auxiliary container is empty and said counterweight is raised by the fall of said auxiliary container when said auxiliary container is filled, means for dumping the contents of said auxiliary container into said weghing container when said auxiliary container has been lowered, means for maintaining said counterweight in raised position, a connection between said counterweight and said gate whereby the fall of said counterweight closes said gate and mechanism for releasing said counterweight-maintaining means.

9. The combination as defined by claim 8 characterized by the addition of means for maintaining said gate in the open position when said counterweight is raised by the filling of said auxiliary container, and mechanism for releasing said gate-maintaining means.

10. In a weighing apparatus having a weighing container and a gate adapted to control the flow of material thereto, the combination of means for opening and closing said gate, a latch adapted to maintain said gate in an open position, a weight maintained in an elevated position by said latch, and means for releasing said latch to allow closing of said gate and dropping of said weight, said weight being adapted to fall upon said gate closing means to facilitate said closing.

11. In a weighing apparatus having a weighing container and a gate adapted to control the flow of material thereto, the combination of means for opening said gate, a latch adapted to maintain said gate in the open position, mechanism adapted to release said latch to allow partial closing of said gate when a predetermined weight of material has entered said container, a second latch adapted to maintain said gate in the partially closed position, a weight maintained in an elevated position by said second latch, and means for releasing said second latch when a second predetermined weight of material has entered said container to allow complete closing of said gate and to allow dropping of said weight to facilitate said closing.

12. Apparatus for weighing the ingredients of a batch of material one of which contains a known percentage of a second including a scale for said second ingredient having a scale beam, graduations upon said scale beam indicating the amount of said second ingredient desired, a counterpoise carried upon said beam associated with said graduations, a second set of graduations upon said beam, graduated to indicate the total weight of said first ingredient in each batch, and a counterpoise associated with said second set of graduations, said counterpoise having a weight bearing a fixed relationship to the percentage of said second ingredient contained in said first ingredient, said graduations being so placed upon said beams that when said counterpoises are placed respectively upon the graduations indicating the desired weights of said second and first ingredients an amount of said second ingredient is weighed equal to the desired amount thereof less the amount carried in the batch weight of said second ingredient.

13. In a weighing apparatus having a weighing hopper, the combination of a movable bottom for said hopper, yielding means tending to raise said bottom against the weight of material in said hopper, an electrical contact controlled by upward movement of said bottom in response to the action of said yielding means when said hopper is empty, a gate controlling the flow of material to said hopper, electrical mechanism controlled by said contact to open said gate, and other mechanism for closing said gate.

14. In a weighing apparatus having a weighing hopper and a dump bottom therefor, the combination of a member movable in response to the weight of material in said hopper, means for adjusting said member to move when a predetermined weight of material has entered said hopper, and means for changing said adjustment automatically operable by return of said bottom to closed position after dumping.

15. In a weighing apparatus having a weighing hopper and a dump bottom therefor, the combination of a member movable in response to the weight of material in said hopper, means for adjusting said member to move when a predetermined weight of material has entered said hopper, means for changing said adjustment automatically operable by return of said bottom to closed position after dumping, and means for automatically returning said adjustment to its intial condition when a predetermined amount of material has entered said hopper.

16. In a batch weighing apparatus having a scale beam and weighing container, the combination of a counterpoise carried upon said scale beam, said counterpoise being adjustable thereon to a position corresponding to a lesser weight than that of the batch to be weighed, and means automatically operable upon the attainment of said lesser weight to move at least a portion of said counterpoise upon said beam to bring said counterpoise to the position corresponding to the weight of the batch to be weighed.

17. In a batch weighing apparatus having a scale beam and a weighing container, the combination of a counterpoise carried upon said scale beam, said counterpoise being adjustable thereon to a position corresponding to the weight of the batch to be weighed, means automatically operable upon the commencement of flow of material into said container to move at least a portion of said counterpoise upon said beam to a position corresponding to a lesser weight, and means automatically operable upon the attainment of said lesser weight to return said counterpoise to the position corresponding to the weight of the batch to be weighed.

18. In a batch weighing apparatus having a weighing container and a gate adapted to control the supply of material thereto, the combination of a scale beam movable in response to the weight of material in said container, a counterpoise upon said scale beam adjustable to a position corresponding to a lesser weight than that of the batch to be weighed, and control apparatus operable by movement of said scale beam when said lesser weight has been attained and operating to move said counterpoise along said beam to a position corresponding to the weight of the batch to be weighed and to partially close said gate.

19. In a batch weighing apparatus having a weighing container and a gate adapted to control the supply of material thereto, the combination of a scale beam movable in response to the weight of material in said container, a counterpoise upon said scale beam adjustable to a position corresponding to a lesser weight than that of the batch to be weighed, control apparatus operable by movement of said scale beam when said lesser weight has been attained and operating to move said counterpoise along said beam to a position corresponding to the weight of the batch to be weighed and to partially close said gate, and control apparatus operable by movement of said scale beam when said last mentioned weight has been obtained and operating to completely close said gate.

ROBERT E. ROBB.